US006742224B2

(12) United States Patent
Matityahu

(10) Patent No.: US 6,742,224 B2
(45) Date of Patent: Jun. 1, 2004

(54) CABLE CLIP WITH INTEGRAL CONNECTIVITY LOG

(76) Inventor: Eldad Matityahu, 842 Boyce Ave., Palo Alto, CA (US) 94301

( * ) Notice: Subject to any disclaimer, the term of this patent is extended or adjusted under 35 U.S.C. 154(b) by 0 days.

(21) Appl. No.: 10/174,202

(22) Filed: Jun. 17, 2002

(65) Prior Publication Data

US 2003/0106186 A1 Jun. 12, 2003

Related U.S. Application Data

(60) Provisional application No. 60/299,227, filed on Jun. 19, 2001.

(51) Int. Cl.[7] .......................... A44B 21/00; A45F 5/00; G01D 21/00; H04Q 1/00

(52) U.S. Cl. ........................ 24/129 R; 24/3.12; 24/336; 24/458; 24/545; 114/218; 340/825.34

(58) Field of Search ............................. 24/129 R, 3.11, 24/3.12, 3.13, 458, 585, 545, 336; 114/218

(56) References Cited

U.S. PATENT DOCUMENTS 2,729,868 A * 1/1956 Manning ..................... 24/545
2,802,249 A * 8/1957 Kulp .......................... 24/3.12
5,123,146 A * 6/1992 Olson ...................... 24/30.5 R
5,512,887 A * 4/1996 McAllister ............. 340/825.34
5,747,710 A * 5/1998 Carmichael ................ 73/866.5
5,867,874 A * 2/1999 Simpson ...................... 24/336
6,283,348 B1 * 9/2001 Wang ......................... 24/3.12
6,477,744 B1 * 11/2002 Miles ......................... 24/3.12

* cited by examiner

*Primary Examiner*—Victor Sakran
(74) *Attorney, Agent, or Firm*—George S. Cole

(57) ABSTRACT

By inserting at least one cable connecting two or more electronic devices (communication, audio, display, input/output, or other) into a clip that joins the cable(s) to a log detailing the cable's connections, subsequent maintenance of and changes to that connection are made simpler and more efficient. The preferred approach inserts one end of each connecting cable into a clip having a socket for a detachable log; a second approach connects the clip to an already-attached cable. The detachable log keeps the functional information concerning each cable, and its connections, held by said clip, including the physical characteristics, functional purpose, and details of the other end(s) attachment(s) and target(s). Another function of said clip permits more stable and easily-handled insertion or removal of one or more cable(s) from the device to which it is or they are attached.

25 Claims, 5 Drawing Sheets

CABLE CLIP WITH INTEGRAL CONNECTIVITY LOG

CROSS-REFERENCE TO RELATED PROVISIONAL PATENT APPLICATION

This application is a continuation of the provisional patent application 60/299,227 titled identically as "Integral Cable Connectivity Log", filed on Jun. 19, 2001 by the same inventor.

STATEMENT REGARDING FEDERALLY SPONSORED RESEARCH OR DEVELOPMENT

Not Applicable

BACKGROUND OF THE INVENTION

1. Field of the Invention

This invention is in the field of cables, and more particularly in the field of field-expedient documentation logs, and other means, for recording the details of the connections formed by each particular cable and providing those details to the field technician actually handling such cables. Each cable connects and links together various devices—electronic, optical, or optical-electronic—which may be communications, computer, audio, visual, input, output, or otherwise information-managing devices—and each such connection has both physical and logical complexities that a field technician must manage, as the dynamics of the connection and cabling change with use and time.

2. Description of the Related Art

Anyone who has maintained the physical connections between multiple devices (chiefly electronic) which intercommunicate, and had to trace a cable from one end to the other to find out what device is at the other end(s) thereof and thereby is connected by that cable, is at least potentially familiar with the problem addressed by this invention. Standing at one end of a cable (communications, fiber-optic, home stereo, video, Ethernet, or other), you often cannot see the other end. Or you cannot distinguish that other end from any of a number of other cables surrounding you and plugged into the devices, all of which (or worse, only some of which) form the network of intercommunication you are attempting to manage. A great deal of time, when one is trying to maintain, update, or otherwise change a network of physically connected devices, is spent tracing connections and confirming that the cable in the hand links to the desired device at the cable's opposite end. There are four current approaches to the problem addressed in this invention, none of which meets the objects of this invention.

In the first approach a physically separate printed log is maintained listing which cable joins which ports. These listings are typically kept in an inexpensive but bulky binder or notebook, or in a separate file on a computer, and accessing them requires finding and bringing along the separate access device (binder, PDA, or laptop) and then identifying (by location, first connection, description, or other means) the cable of concern. In the second approach, each end of each cable is imprinted with an icon representing the type of cable to which that end is meant to attach. This requires each device to include dozens of different molds for all possible combinations of cables, and degrades the value of common, and open, cabling and connection standards such as USB, Firewire, or Ethernet or of flexible connections. In the third approach, human intelligence traces each cable on each use, which is labor and time intensive, particularly with complex networks, on a more-than-linear basis. The fourth approach is to use ad-hoc or improvised means (colored twist ties, temporary sticky notes, daubs of paint or nail polish) to distinguish one cable from another, but relies on the technician's memory and defeats standardized maintenance, or at least increases its cost considerably by the need to train each worker to the ad-hoc or impromptu means.

The average technician or user, standing at a device with one of the myriad cables linking it into the network in his hand, wants a simple and direct approach: he would like that cable itself to tell him what lies at the other end. The main object of this invention is to meet that need with a simple, inexpensive, and integral solution.

SUMMARY OF THE INVENTION

By providing, for at least one end of a cable connecting one or more electronic or other devices (communication, computing, input/output, display, or otherwise), a clip which joins that cable to a log containing the information about the purpose, nature, placement, and physical and logical mapping for the connection(s) provided by that cable(s), any person later examining the log (preferably kept in a socket in the clip and thus immediately at hand and available for inspection) may discover in one place and at the point of need all the relevant information concerning that cable's purpose, nature, function, placement, and opposite end(s). Optimally both ends, or all ends, of all cables would have or use such clips containing in their sockets the correctly recorded contextual information concerning their particular portion of the current configuration. Then when working with multiple cables, or with any cable whose other end is not in the present view, confusion or uncertainty is reduced to a minimum by providing at each point the necessary and accurate information which direct observation cannot otherwise supply.

DETAILED DESCRIPTION OF THE INVENTION

Objects of the Invention

Figure 1:
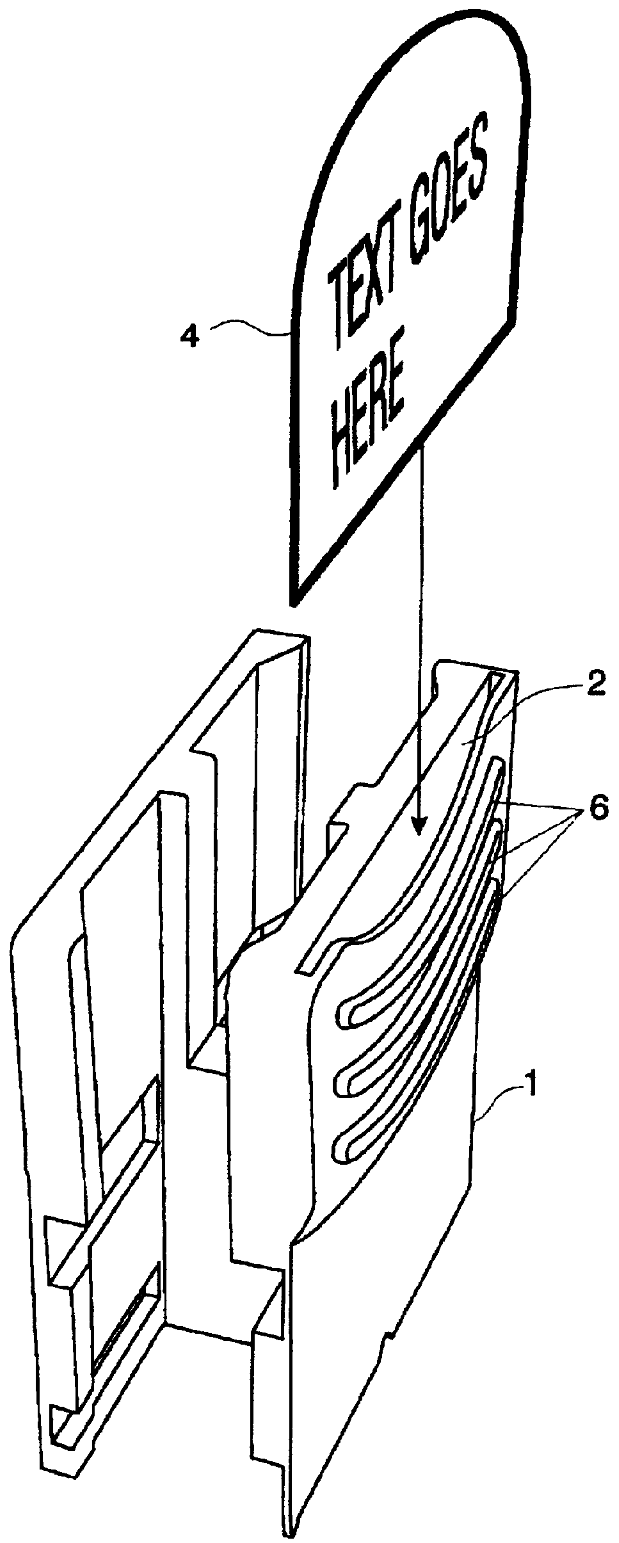
FIG. 1 is a partial side and partial front view of a clip (1) containing a socket (2) into which a log (4) can be slipped, with room for two cables (not shown) and a molded grip for easy handling (6) while inserting or removing a cable or the log, or attaching the cable to the device to which this end of the cable(s) is to be connected. In the preferred embodiment, the log (4) is a piece of stiffened, heavy-duty paper suitable for writing on; however, in alternative embodiments this may be a smart chip or other recording media for holding the information concerning the cables which are inserted into the clip.
Figure 2B:
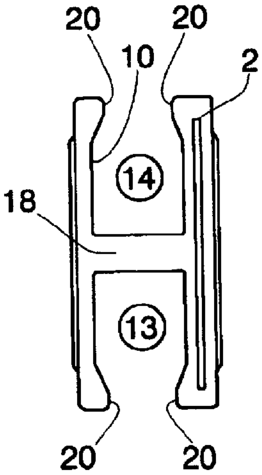
FIG. 2 is multiple views (A=side front, B=top, C=side rear, D=left side, and E=side back) of the preferred embodiment of the present invention. Each clip has a top (10) and bottom (11) face, and can accommodate two cables side-by-side in a left (13) and right (14) channel, respectively. Both faces contain molding for an easy grip (6), and the two faces are joined by a central wall (18) and have shaped molding on the outer sides to help hold the cables into the clip (20). In the top face there is a socket (2) for holding the insertable log.
Figure 2A:
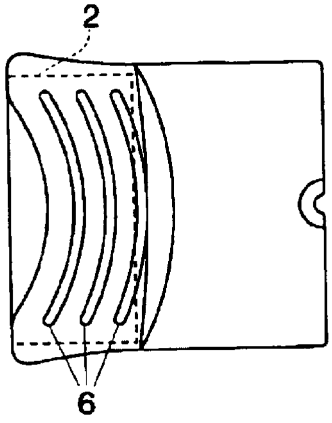
Figure 2C:
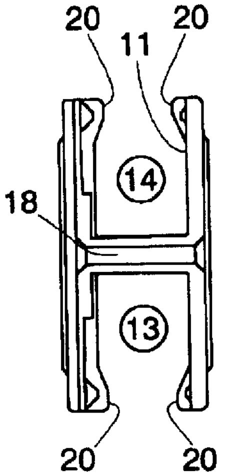
Figure 2D:
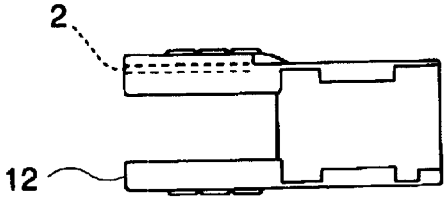
Figure 2E:
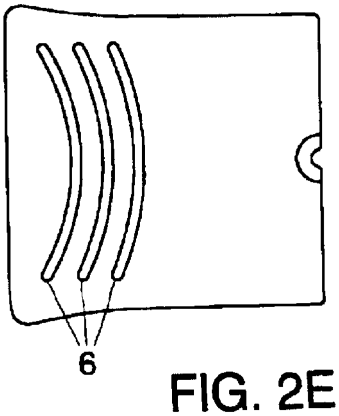
Figure 3:
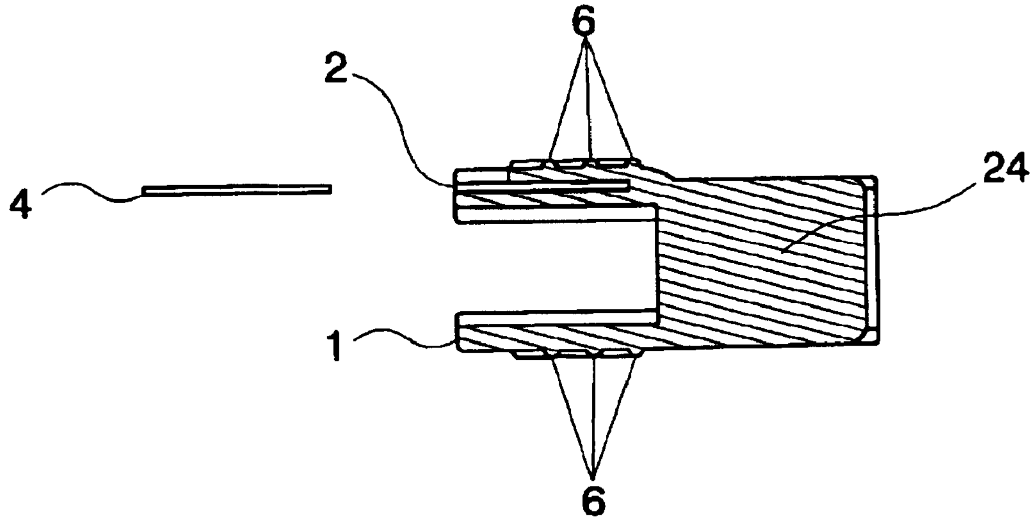
FIG. 3 is a cut-away side view of the clip (1) showing the socket (2), the molded grip (6), and the joining wall at the very center of joining piece (24); it also shows how the insertable log (4) can be slid into the socket (2).
Figure 4:
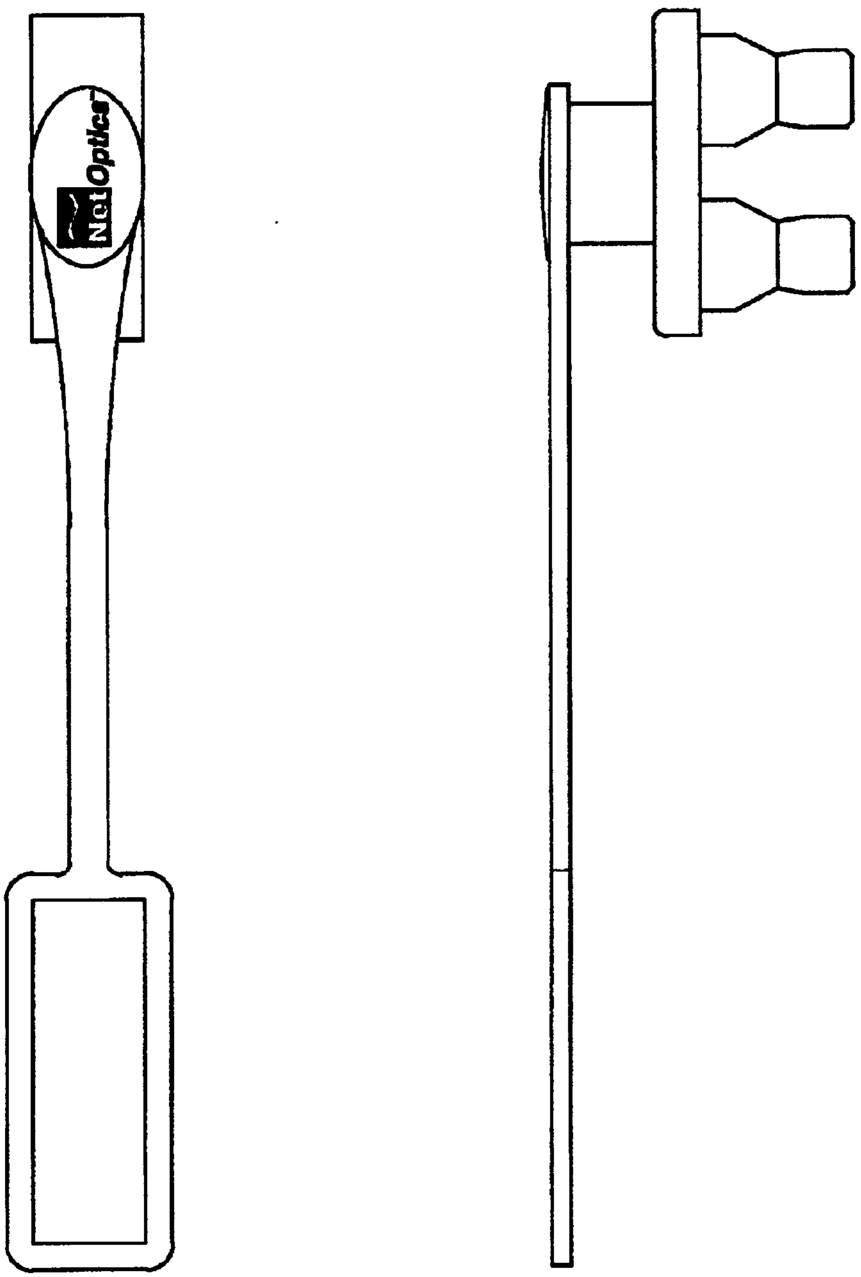
FIG. 4 is top and side views of an optional dust-plug and lanyard into which one or more cables may be inserted at the loop (30), which can then have either or both of its flexible plugs (32) inserted into any one or pair of the clip's open back ends, thereby sealing an otherwise open port(s) of the device to which the clip is attached against environmental hazards such as dust or insects.
Figure 5:
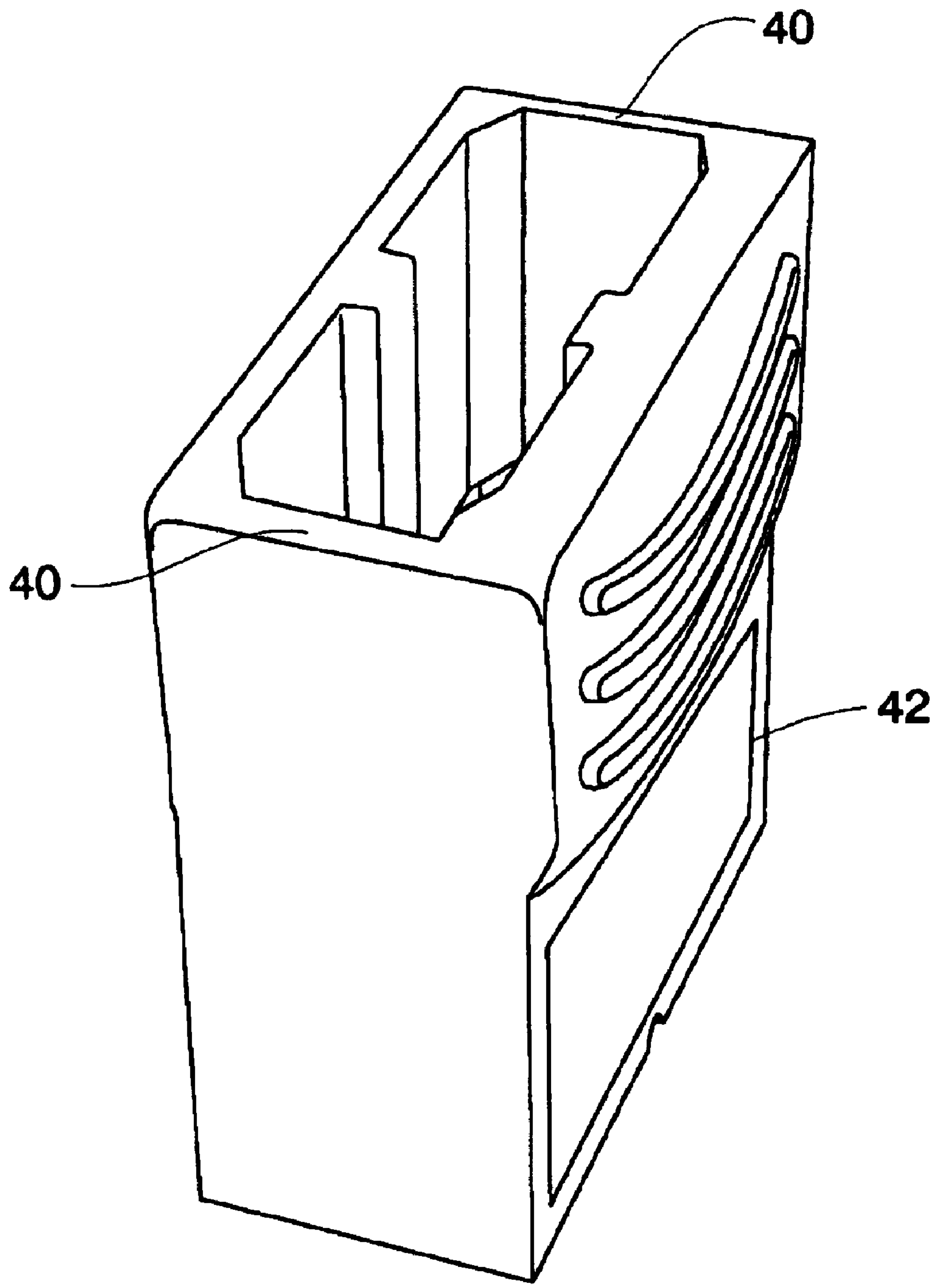
FIG. 5 is a view of a clip with enclosing side walls (40) and an external recording surface (42).

The object of the invention is to provide means whereby a technician or lay person examining one end of a cable which is or was attached to a device (such as a stereo component, computer, computer peripheral, network router, switch, backplane, server, or junction box) can discover both the nature of the cable and what it is attached to at its opposite end(s), without having to physically trace the cable.

A second object of the invention is to provide means whereby a technician or layperson who alters the nature, placement, or end-point of a cable may record both the prior and current state of the cable, to enable easier maintenance, or to revert to the prior state, without having to remember or test every possible reconnection.

A third object of the invention is to provide means whereby a technician or layperson who is examining multiple, similar cables can easily manage the connections provided by the same with a minimum of confusion and a maximum of local information about the nature and purpose of both ends of each of the cables, including those ends out of view, without having to physically trace each cable or make reference to a disparate record, logbook, or device unconnected to the cable.

A clip, preferentially fabricated out of inexpensive but durable material, that can be attached to or hold on to one or more cables connecting one input/output port of an electronic (or other) device to another input/output port of another device (which may be the same or a different device), incorporates means for recording the connection made by the cable or cables to which it is attached. The device may a communications, computer, audio, visual, input, output, or otherwise information-managing device, and may be electronic, optical, optico-electronic, or other. The clip has two sides which are joined together, each side having an outer surface, an inner surface, a front end which is nearest to the device when the clip is attached to the cable, and a back end which is farthest from the device when the clip is attached to the cable. These two sides of the clip are joined together by means which allow the clip to remain attached to the cable. This joinder may be by one ore more inner wall(s) that is(are) aligned between the front and back ends of the sides, which walls enclose and help hold one ore more cables, or this joinder may be by a snap fastening or interlocking snap fastening, by a spring whose tension will draw the two sides together.

The means for recording the connection include having a writable surface on a side of the clip and covering part or all of that side, having at least one socket into and from which a removable log may be inserted and removed, or having a closable flap over one or more inner, and possible extensible, recording surfaces. The recording log may comprise a simple paper tag, dry-erase surface, or an electronic write-read memory chip ('smart chip'), or other means for recording the connection or connections formed by the cable or cables joined by the clip, held by the clip, or to which the clip is attached.

As an additional means of identification, the clips are manufactured in a variety of colors providing technicians or laypersons with another means of inferring connection information.

Preferred Embodiment

One end of one (or more) cable(s) connecting disparate ports of one or more devices (devices presumably electronic, optical, or optico-electronic), is inserted into a clip containing a socket into which a record of that cable's function, characteristics, purpose, and connection details can be and is inserted, before that end of the cable is plugged into the port. The connection log is kept in the socket provided for it in the clip. Subsequently, any individual wishing to learn the details of that cable's connection(s) may remove and examine the log without having to trace the cable's opposite end.

The clip can be made of plastic or other substance which can be mass-produced through molding, stamping, or other well-known industrial processes, and comprises a pair of mostly flat, opposed, sides (10 and 11), which are joined together by (18) a smooth central wall that extends for half the depth of the flat sides for each pair of connecting cables. The outer surfaces of the pair of mostly flat, opposed sides are ridged or beveled to provide an ergonomical gripping surface (6) on the end of the endpiece that will contain the ends of the connecting cable(s). On and into the top mostly flat, opposed side a socket (2) is molded; the socket being large enough to hold an insertable log (4). The log may be paper, a smart chip, or other recording means onto or from which all, or any set, of the following details concerning the cable, connector, and connection linked to said clip may be written or read: (1) the logical connectivity physically realized by such cable(s); (2) the physical characteristics of such cable(s); (3) the physical location of the opposite end(s) of such cable(s); (4) the equipment to which the opposite end(s) of such cable(s) is attached; (5) the nature of the connection represented by such cable(s); (6) any constraints upon the function, tolerances, performances, or location of any such cable(s); (7) any history of such cable(s); and, (8) any known information which may assist with the maintenance, replacement, or use of such cable(s).

In an alternative embodiment each of the mostly flat, opposed sides has a socket into which a removable log may be inserted, and a removable log.

In a third alternative embodiment each of the sockets is separately denoted by numbering, shape, icon, or marking on the mostly flat, opposed side containing the socket.

In a fourth alternative embodiment, at least one flat opposable side has on its surface material that can record information, such as a writable, dry-erase plastic.

In a fifth alternative embodiment the clip has with it a removable, flexible lanyard, one end of said lanyard being a loop through which any cable that will be inserted into said clip is first inserted, the other end of said lanyard being connected to said clip.

In a sixth alternative embodiment the lanyard is detachable from the clip.

In a seventh alternative embodiment the log is a smart chip.

In an eighth alternative embodiment the log is a device readable storage element, for example, a bar-coded printout.

In a ninth alternative embodiment the lanyard contains an insertable and removable plug for one or more connector ends of the endpiece, which can seal the same against intrusion of dust, an insect, or other environmental contaminants.

I claim:

1. A clip for attaching a connection log to at least one cable connecting at least one input/output port of a first device to a different input/output port, the clip comprising:

a first mostly flat side, having a front end, a back end, an inner surface, and an outer surface;

a second mostly flat side, having a front end, a back end, an outer surface, and an inner surface; and, means for joining the first mostly flat side to the second mostly flat side;

wherein the cable is held between the first and second sides and is aligned from the front to back ends; and, a recording surface on the first mostly flat side.

2. A clip as in claim 1, further comprising a lanyard with one end attached to the clip and a second end having a loop through which any cable held by the clip may first be passed.

3. A clip as in claim 2, wherein the lanyard is detachable from the clip.

4. A clip as in claim 3, wherein the lanyard has a second end that is formed into a flexible, insertable and removable dustplug which can seal the clip against intrusion of environmental contaminants.

5. A clip for attaching a connection log to at least one cable connecting at least one input/output port of a first device to a different input/output port, the clip comprising:

a first mostly flat side, having a front end, a back end, an inner surface, and an outer surface;

a second mostly flat side, having a front end, a back end, an outer surface, and an inner surface; and, means for joining the first mostly flat side to the second mostly flat side;

wherein the cable is held between the first and second sides and is aligned from the front to back ends; and, at least one socket in the first mostly flat side into which a removable log may be inserted.

6. A clip for attaching a connection log to at least one cable connecting at least one input/output port of a first device to a different input/output port, the clip comprising:

a first mostly flat side, having a front end, a back end, an inner surface, and an outer surface;

a second mostly flat side, having a front end, a back end, an outer surface, and an inner surface;

a separating wall, said separating wall being attached to the inner surface of the first mostly flat side;

attached to the inner surface of the second mostly flat side;

between the front ends and back ends of the inner surfaces and, aligned between the front ends and back ends of the inner surfaces;

wherein the cable is held between the first and second sides and is aligned from the front to back ends; and, means for retaining a record of the cable's connections.

7. A clip as in claim 6, which the separating wall is attached to the centers of the inner surfaces.

8. A clip as in claim 6, wherein the first and second mostly flat sides are shaped with portions of the distal side edges extending towards the opposite mostly flat side and paralleling the separating central wall, so as to provide one or more channels into which the cables can be inserted that will better hold any cable in such channel.

9. A clip for attaching a connection log to at least one cable connecting at least one input/output port of a first device to a different input/output port, the clip comprising:

a first mostly flat side, having a front end, a back end, an inner surface, and an outer surface containing at least one socket into which a removable log may be inserted;

a separating ventral wall connected along the center of the inner surface and aligned between the front and back ends of the first mostly flat side; and, a second mostly flat side, having a front end, a back end, an outer surface, and an inner surface connected to the central wall such that the second mostly flat side is parallel and opposite to the first mostly fiat side;

wherein the cable is enclosed between the first and second sides and is aligned from the front to back ends; and, means for joining the clip and cable.

10. A clip as in claim 9, wherein both the first and second mostly flat sides are ergonomically shaped to provide a ready grip on their respective outer surfaces.

11. A clip as in claim 9, wherein the first and second mostly fiat sides are shaped with portions of the distal side edges extending towards the opposite mostly fiat side and paralleling the separating central wall so as to provide channels, into which the cables can be inserted and which can better hold the cables in such channels.

12. A clip as in claim 9, wherein the second mostly flat side also contains at least one socket into which a removable log may be inserted.

13. A clip as in claim 9, wherein the separating central wall forms a connection only partially between the front and back ends of said first and second flat sides, leaving enough room between the first and second flat sides for a connector to be bent over from one side of the central wall to the other without extending beyond the limits of the first and second mostly flat sides.

14. A clip as in claim 9, also comprising a removable log.

15. A clip as in claim 14, wherein the removable log comprises a fitted piece of stiff notepaper suitable for repeated insertion, removal, writing, and erasure.

16. A clip as in claim 14, wherein the removable log comprises a device-readable data storage element.

17. A clip as in claim 16, wherein the removable log comprises a smart chip.

18. A clip for attaching a connection log to at least one cable connecting at least one input/output port of a first device to a different input/output port, the clip comprising:

a first mostly flat side, having a front end, a back end, an inner surface, and an outer surface containing at least one socket into which a removable log may be inserted and a distinctive element;

a separating central wall connected along the center of the inner surface and aligned between the front and back ends of the first mostly flat side; and, a second mostly flat side, having a front end, a back end, an outer surface, and an inner surface connected to the central wall such that the second mostly flat side is parallel and opposite to the first mostly flat side, the outer surface also containing a second distinctive element that is differentiated from the distinctive element on the first mostly flat side.

19. A chip as in claim 18, wherein the distinctive element and second distinctive element are each a human-perceptible visual marking.

20. A clip as in claim 18, wherein the distinctive element and second distinctive element are each a human-perceptible tactile marking.

21. A clip as in claim 18, further specifically formed to match a standardized denotation scheme for particular input/output ports.

22. A clip as in claim 21, wherein the external surfaces of the opposed mostly flat sides are colored in accordance with a standardized denotation scheme for particular input/output ports.

23. A clip as in claim 21, wherein at least one external surface of the opposed mostly flat sides has molded therein a shape in accordance with a standardized denotation scheme for particular input/output ports.

24. A clip as in claim 18, wherein:

the first and second mostly flat sides' inner surfaces are shaped to provide additional grip upon any cable held by the clip.

25. A clip as in claim 18, further comprising, for each pair of cables that may be held by the clip,:

multiple separating central walls so as to separate each pair of cables, wherein each such separating central wall:

is connected along the center of the inner surface and aligned between the front and back ends of the first mostly flat side; and, leaves enough room between the first and second flat sides for a connector to be bent over from one side of that separating central wall to the other side of that separating central wall without extending beyond the limits of the first and second flat side.

* * * * *